Patented Mar. 24, 1936

2,035,048

UNITED STATES PATENT OFFICE 2,035,048

MANUFACTURE OF YEAST

Stephan Carl Darányi, Hamburg, Germany

No Drawing. Application October 5, 1931, Serial No. 567,141. In Hungary, Germany, and Austria April 23, 1931

3 Claims. (Cl. 195—78)

This invention relates to improvements in the manufacture of yeast.

In the modern air yeast industry as is known the raw materials are worked up in very dilute solutions. Molasses, for example, is diluted about 25 times. The yeast concentration of these strongly diluted solutions at any particular time is likewise small, it varies usually between 3.2 and 3.8% and rises only in exceptional cases to about 5%. Any marked overstepping of these concentration values hitherto led to practical difficulties so that a rational method of working was no longer possible.

The main object of the present invention is the successful working up of essentially more concentrated solutions.

In accordance with the present invention the solutions are pitched with such large quantities of seed yeast that the yeast concentration of the solution is a very high one from the beginning, namely the minimum yeast concentration is about 8%. This high yeast concentration is retained during the entire course of the fermentation, precautions being taken to maintain this value even when fresh solutions of raw material are introduced into the process.

The nature of the new process is described in the examples of operation given below. The following numerical data are the results of large scale experiments, but they are not to be considered as values to which the process is in any way limited. Likewise the process is not limited to definite working methods; it can be effected continuously and also intermittently.

As an example a system of three fermentation vessels may be selected. The first vessel is charged with an about 12½ times diluted molasses solution and after the addition of the customary ingredients is pitched. As pitch yeast serves for example normal press yeast from a previous operation which has previously been mixed, for example, in the ratio of 5:1 with fresh mother yeast (for example so-called grade 4 mother yeast). Grade 4 mother yeast means the fourth generation obtained in the multiplication of a yeast derived from a pure culture, or in other words a mother yeast rich in nitrogen. The quantity of this pitch yeast is such that the yeast concentration of the pitched solution amounts to about 18%. Immediately thereafter aeration takes place. After about 2 hours a portion, in the case assumed ⅛th of the content of the vessel, is let out into the second vessel. At the same time the first vessel is filled up to the original volume with the same quantity of a fresh but more concentrated, about 16–20%, molasses solution. This newly introduced concentrated molasses solution is likewise previously subjected to the addition of the customary nutrient preparations and also fresh mother yeast is added to the extent of about 4% of the newly added solution. At the end of the first two hours the yeast concentration in the first vessel increases by about 2.5%, that is to say it amounts to about 20.5%. By the freshly introduced concentrated molasses solution the yeast concentration in the first vessel, taking into account the already added mother yeast, is reduced approximately to the starting concentration of 18%. After a further 2 hours the yeast concentration again rises to 20.5%, ⅛th of the yeast containing solution is again drawn off and the original volume again made up by the addition of fresh concentrated molasses solution. This is repeated every two hours.

The solution of 20.5% yeast concentration drawn off at 2 hour intervals from the first vessel and let out into the second, still contains about 2% of fermentable carbohydrates. The carbohydrate residues are completely worked up by the yeast with aeration in the course of 2 hours. Thereby the yeast experiences a further 2.5% increase so that the yeast concentration in the second vessel finally rises to 23%. The unfermentable constituents of the 16–20% molasses solution introduced from time to time into the first vessel in this manner pass entirely into the second vessel. The addition of the customary nutrient preparations in the second vessel can be dispensed with.

After the yeast has completed its multiplication with the working up of the nutrient materials passing into the second vessel, the content of this vessel, likewise every two hours, is transmitted to the third vessel where the ripening of the yeast takes place. The third vessel in contradistinction to the previous ones contains no devices for aeration. Ripening of the yeast takes place in this vessel without external influence. The cell connections separate, the cell walls are correspondingly developed and the assimilated substances in the cell plasm arrange themselves and attain an equilibrium and so on. After the lapse of 2 hours the contents of the third vessel can be passed for isolation of the yeast to the separators (centrifuges or the like).

The results of the described process are remarkably favourable. Although the yeast growth is apparently small in relation to the yeast concentration since the yeast concentration of the starting solution increases from the original 18% only to 23% that is only by about 27%, however, calculated on the weight of the molasses worked up, this yeast growth is very considerable and exceeds to an important degree the yields amounting on an average to about 80% which could be obtained in the process hitherto used with considerably diluted solutions.

The numerical data in the described modification can be varied within certain limits both between themselves and in reference to their actual values. Favourable results were obtained, inter alia, also with an initial yeast concentration of 12% and a molasses concentration of 10%. In the three vessel system assumed in the example, the ratio of the yeast multiplication can be varied both in general and also with reference to the distribution of the multiplication between the first two vessels. The periods of time and also the quantity proportions in which the fresh solutions of raw materials are added to the first vessel or in which the partly fermented contents of the said first vessel are drawn off into the second vessel can likewise be varied and suited to the working conditions selected at any time.

In a preferred modification of the process the initial yeast or carbohydrate concentration in the first vessel is essentially maintained; this is, however, no essential feature of the process, it is only important that on the one hand the yeast concentration and on the other hand the carbohydrate concentration are maintained above a certain minimum limiting value. The multiplication of the yeast, instead of taking place in the two stages described, can be effected in one or, if desired, also in more than two stages, that is to say the process can be carried out in a single or in more than three vessels. Fresh raw material solution is advantageously only supplied to the first vessel, the nature of the process is however not altered when a portion of the concentrated solution is immediately introduced into the second vessel.

In accordance with the large scale experiments the best results were obtained when the selected molasses and yeast concentrations amounted to 4–6 times the hitherto predominatingly customary 3.2–3.8% concentration, however, at a yeast-concentration of about 8% a marked improvement in yield took place.

The otherwise customary operations in yeast production can likewise find application within the scope of the present invention without essential modification.

Obviously not only molasses but any suitable raw material for yeast production can be worked up according to the new process and also mixtures of other raw materials with one another or with molasses.

A further advantage of the new process consists in the very good utilization of the vessel space, on account of the application of concentrated raw material solution and the rapid multiplication of the yeast. In the example given above only a fraction of the vessel space necessary for the working up of the customary about 25 times diluted solutions is necessary. A further advantage of the new process consists in that also the total requirement of fresh mother yeast is about one quarter less than in the known air yeast process. The yeast produced according to the new process possesses all the favourable properties of good press yeast, in particular its raising power is very high.

The remarkably favourable results obtained by the new process may be explained in various ways. The high yeast concentration, that is to say, the particularly dense distribution of the yeast cells in the starting solution, in any case has an effect in the sense that although the relative rate of multiplication of the yeast on account of the high yeast concentration is essentially reduced, yet the absolute rate of multiplication is very large on account of the rapid assimilation of the carbohydrate nutrient materials which are present in relatively small quantities in proportion to the high yeast content of the solution. With reference to the nutrient materials to be worked up however, it is actually this absolute rate of multiplication which is of importance. The circumstance also appears to have a favorable effect that the cells of the yeast mass contained in the first vessel are spending a considerable time in uninterrupted intensive multiplication, the overwhelming part, namely the cells of the yeast mass which propagates in the vessel from the beginning of the process, is multiplying for at least 4 hours, and the cells of the quantity of fresh mother yeast introduced after the first two hours of propagation are multiplying for at least 2 hours, whereby the yeast cells attain in a comparatively very short time to the maximum of the rate of multiplication. The strongly budding cells transferred from the first vessel into the second in considerable number, and being in the state of maximum rate of multiplication, take up extremely rapidly the still present nutrient materials serving for the completion of their growth, so that the content of fermentable carbohydrates is practically entirely used up in a short time.

The high yield of yeast obtained with the new process appears also to have some relation to the fact that the densely distributed yeast easily and immediately assimilates the alcohol formed and employs it in the multiplication. As it is known, the multiplication radius of the yeast is smaller than the fermentation radius; in the new process, however, in which the distribution of the large number of yeast cells in the solution is so dense that the separating distances of the cells are not larger than the multiplication radius, on the one hand the excess of the fermentation radius has no effect, and on the other hand the conditions for the assimilation of the alcohol formed are extremely favourable. "Fermentation radius" means the radius of that fluid quantity believed to surround the individual cell in spherical form on which the enzymes of the individual cell are capable of acting. The "multiplication radius" means the radius of that fluid quantity believed to surround the individual cell in spherical form which contains sufficient quantities of nutritive substances to enable the individual cells to multiply. These radii are of different size, and if the number of individual yeast cells contained in the fluid is increased, there occurs that difference in favor of the multiplication radius referred to above.

The correctness of the above assumption cannot indeed at the present time be proved with certainty, however, they offer a sufficient basis for the statement of the technical rule by which the lower limit of the high yeast and nutrient material concentrations characterizing the new process can be approximately established. According to this rule the yeast concentration is suitably of such a value that the yeast cells in the solution are so densely distributed that a certain optimum ratio exists between the separating distance of the cells on the one hand and the multiplication and fermentation radii on the other hand. According to practical experiments this lower limit of the yeast concentration amounts to about 8%, as specified above.

Various changes may be made in the details disclosed in the foregoing specification without departing from the invention or sacrificing the advantages thereof.

I claim:—

1. A continuous process for the manufacture of yeast which comprises seeding a wort, which contains 3 to 20 per cent of carbohydrates that are fermentable by yeast, and also yeast nutrient salts, with such a large quantity of pitch yeast as to have at least 8 kgrs. of yeast per hectolitre of wort, aerating the wort, thereby causing the yeast to propagate and its concentration in the wort to rise until it has consumed the overwhelming part of the available sugar content of the wort, drawing off a portion of the yeast-containing wort, in which some carbohydrates and nutrient salts will still be contained, and while on the one hand replacing the withdrawn portion by adding to the remaining wort such further quantities of a solution of yeast nutrient carbohydrates with yeast nutrient salts as will reduce the increased yeast concentration, but will not allow the concentration in the resulting wort to sink under the minimum of 8 kgrs. of yeast per hectolitre, and repeating the operations of withdrawal and replenishment, on the other hand causing further propagation of the yeast in the withdrawn portions, also with aeration, until the carbohydrates contained in said portions will be substantially exhausted, then discontinuing the aeration of the said portions, leaving the yeast to ripen in said portions, and finally removing it from same.

2. A continuous process for the manufacture of yeast which comprises seeding a wort, which contains 3 to 20 per cent of carbohydrates that are fermentable by yeast, and also yeast nutrient salts, with such a large quantity of pitch yeast as to have at least 8 kgs. of yeast per hectolitre, aerating the wort, thereby causing the yeast to propagate and its concentration in the wort to rise until it has consumed the overwhelming part of the available sugar content of the wort, drawing off a portion of the yeast-containing wort, in which some carbohydrates and nutrient salts will still be contained, and while on the one hand replacing the drawn-off portion by adding to the remaining wort such further quantities of a solution of yeast nutrient carbohydrates with yeast nutrient salts as will reduce the increased yeast concentration, but will not allow the concentration in the resulting wort to sink under the minimum of 8 kgrs. of yeast per hectolitre, and repeating the operations of withdrawal and replenishment, on the other hand adding to the withdrawn portions further quantities of solutions of yeast nutrient carbohydrates with yeast nutrient salts, causing further propagation of the yeast in the withdrawn portions, also with aeration, until the carbohydrates contained in said portions will be substantially exhausted, then discontinuing the aeration of said portions, leaving the yeast to ripen in these portions, and finally removing it from same.

3. A continuous process for the manufacture of yeast which comprises seeding a wort, which contains 3 to 20 per cent of carbohydrates that are fermentable by yeast, and also yeast nutrient salts, with such a large quantity of pitch yeast as to have at least 8 kgrs. of yeast per hectolitre of wort, aerating the wort, thereby causing the yeast to propagate and its concentration in the wort to rise until it has consumed the overwhelming part of the available sugar content of the wort, drawing off a portion of the yeast-containing wort, in which some carbohydrates and yeast nutrient salts will still be contained, and while on the one hand replacing the withdrawn portion by adding to the remaining wort such further quantities of a solution of yeast nutrient carbohydrates with yeast nutrient salts as will restore the increased yeast concentration to its initial value, and repeating the operations of withdrawal and replenishment, on the other hand adding to the withdrawn portions further quantities of solutions of yeast nutrient carbohydrates with yeast nutrient salts, causing further propagation of the yeast in the withdrawn portions, also with aeration, until the carbohydrates contained in said portions will be substantially exhausted, then discontinuing the aeration of said portions, leaving the yeast to ripen in said portions, and finally removing it from same.

STEPHAN CARL DARÁNYI.